(12) United States Patent
Lok et al.

(10) Patent No.: US 7,655,593 B2
(45) Date of Patent: Feb. 2, 2010

(54) CATALYSTS

(75) Inventors: Cornelis Martinus Lok, Cleveland (GB); Jill Turner, Cleveland (GB)

(73) Assignee: Johnson Matthey PLC, London (GB)

( * ) Notice: Subject to any disclaimer, the term of this patent is extended or adjusted under 35 U.S.C. 154(b) by 266 days.

(21) Appl. No.: 11/579,894

(22) PCT Filed: May 10, 2005

(86) PCT No.: PCT/GB2005/001780

§ 371 (c)(1),
(2), (4) Date: Nov. 10, 2006

(87) PCT Pub. No.: WO2005/107942

PCT Pub. Date: Nov. 17, 2005

(65) Prior Publication Data

US 2008/0139381 A1    Jun. 12, 2008

(30) Foreign Application Priority Data

May 11, 2004    (GB) ................. 0410408.9

(51) Int. Cl.
*B01J 23/00*    (2006.01)
*B01J 21/18*    (2006.01)
*B01J 20/00*    (2006.01)

(52) U.S. Cl. .................. 502/176; 502/63; 502/71; 502/75; 502/77; 502/84; 502/260; 502/327; 502/245; 502/247; 502/309

(58) Field of Classification Search ................. 502/327, 502/176, 65, 73; 252/447
See application file for complete search history.

(56) References Cited

U.S. PATENT DOCUMENTS 3,235,515 A * 2/1966 Taylor ................. 502/337
4,029,601 A * 6/1977 Wiese ................. 502/182
5,874,381 A * 2/1999 Bonne et al. ................. 502/327
7,452,844 B2 * 11/2008 Hu et al. ................. 502/327

FOREIGN PATENT DOCUMENTS

WO    WO-01/87480 A1    11/2001
WO    WO-02/089978 A1    11/2002

OTHER PUBLICATIONS

Wang, Xin-Xi et al., "Studies on the Nanocrystalline $Co_3O_4$ Through Wet Synthesis and Its Microstructure," *Acta Chimica Sinica*, vol. 61, No. 11, 2003, pp. 1849-1853.
Operator's Manual for the Micromeritics ASAP 2010 Chemi System, V2.01, Appendix C, Part No. 201-42808-01, Oct. 1996.
R. W. Lines, J. G. Harfield, W. D. Griffiths, A. P. Rood and M. Alderliesten, "Standardisation in particle sizing," Anal. Proc., vol. 21, Issue 5, 1984, pp. 159-172.
Robert C. Reuel and Calvin H. Bartholomew, "The Stoichiometries of $H_2$ and CO Adsorptions on Cobalt: Effects of Support and Preparation," *Journal of Catalysis*, vol. 85, 1984, pp. 63-77.

* cited by examiner

Primary Examiner—Melvin C Mayes
Assistant Examiner—Colette Nguyen
(74) Attorney, Agent, or Firm—RatnerPrestia (57) ABSTRACT

A method of manufacturing a cobalt catalyst is described, which comprises the steps of forming an aqueous solution of a cobalt amine complex, oxidising said solution such that the concentration of Co(III) in the oxidised solution is greater than the concentration of Co(III) in the un-oxidized solution, and then decomposing the cobalt amine complex by heating the solution to a temperature between 80 and 110° C. for sufficient time to allow an insoluble cobalt compound to precipitate out of the solution. A catalyst intermediate is also described which comprises a cobalt compound, comprising a Co(II)/Co(III) hydrotalcite phase and a $CO_3O_4$ cobalt spine) phase, wherein the ratio of cobalt hydrotalcite phase: cobalt spine) phase is less than 0.6:1, said cobalt hydrotalcite phase and said cobalt spine) phase being measured by X-ray diffractometry.

18 Claims, 4 Drawing Sheets

CATALYSTS

This application is the U.S. National Phase application of PCT International Application No. PCT/GB2005/001780, filed May 10, 2005, and claims priority of British Patent Application No. 0410408.9, filed May 11, 2004.

FIELD OF THE INVENTION

This invention relates to catalysts and in particular to catalysts containing cobalt which are suitable for use in hydrogenation reactions.

BACKGROUND OF THE INVENTION

Catalysts comprising cobalt on a support such as silica or alumina are known in the art for hydrogenation reactions, e.g. for the hydrogenation of aldehydes and nitrites and for the preparation of hydrocarbons from synthesis gas via the Fischer-Tropsch reaction.

In comparison with other catalytic metals such as copper and nickel used for hydrogenation reactions, cobalt is a relatively expensive and so, to obtain the optimum activity, it is desirable that as much as possible of the cobalt present is in an active form accessible to the reactants.

For hydrogenation reactions, the active form of the cobalt is elemental cobalt although in the active catalyst only some, rather than all, of the cobalt is normally reduced to the elemental form. Hence a useful measurers the exposed surface area of elemental cobalt per g of total cobalt present. Except where expressly indicated, as used herein, total cobalt contents are expressed as parts by weight of cobalt (calculated as cobalt metal, whether the cobalt is actually present as the metal or is in a combined form, e.g. as cobalt oxides) per 100 parts by weight of the catalyst or precursor thereto.

Cobalt catalysts on different carriers are disclosed in "Stoichiometries of $H_2$ and CO Adsorptions on cobalt", Journal of Catalysis 85, pages 63-77 (1984) at page 67, table 1. From the total maximum $H_2$ uptake, it is possible to calculate the cobalt surface area per gram of catalyst and the cobalt surface area per gram of cobalt.

U.S. Pat. No. 5,874,381 describes a cobalt on alumina catalyst which contains between 3 and 40% by weight of cobalt and which has a relatively high cobalt surface area of above 30 $m^2/g$ of total cobalt.

As indicated above, the dispersion of the cobalt on the carrier is important since it is the surface of the cobalt of the catalyst which is catalytically active. Therefore it is beneficial to maximise the surface area of the metal which is present so as to produce a catalyst which has a high cobalt surface area per unit mass of total cobalt. It may be expected that the dispersion of the cobalt on the catalyst would be maximised at relatively low loadings of cobalt and that, as the amount of cobalt contained in the catalyst is increased, the surface area per gram of cobalt would decrease because the cobalt becomes more difficult to disperse on the support.

The aforementioned U.S. Pat. No. 5,874,381 suggests and exemplifies the production of the catalysts by impregnation of shaped transition alumina particles, e.g. extrudates, with a solution of cobalt ammine carbonate, followed by removal of the excess solution and heating to decompose the cobalt ammine carbonate. We have found that the preparation of cobalt catalysts by the decomposition of cobalt ammine carbonate may be improved.

SUMMARY OF THE INVENTION

Accordingly the invention provides a method of manufacturing a catalyst, or precursor thereto, comprising the steps of forming an aqueous solution of a cobalt ammine complex, allowing the solution to oxidise such that the concentration of Co(III) in the oxidised solution is greater than the concentration of Co(III) in the un-oxidised solution, and then decomposing the cobalt ammine complex by heating the solution to a temperature between 80 and 110° C. for sufficient time to allow an insoluble cobalt compound to precipitate out of the solution.

BRIEF DESCRIPTION OF THE DRAWINGS

The invention will be further described in the following experimental examples and the accompanying drawings, which are.

DETAILED DESCRIPTION OF THE INVENTION

We have found that when the cobalt ammine complex solution is allowed to oxidise so that at least some of the cobalt (II) in the complex is converted to Co(III), the composition of the insoluble cobalt compound resulting from the decomposition of the cobalt ammine complex is readily reducible to cobalt metal of high surface area. Without wishing to be bound by theory, we believe that the cobalt species which is precipitated from the solution of complex, e.g. a cobalt ammine carbonate complex, comprising Co(III) species contains a greater amount of $CO_3O_4$ and less cobalt carbonate, cobalt hydroxycarbonate or ammonia than is deposited from the decomposition of a freshly made solution containing more Co(II) and less Co(III). Preferred complexes are cobalt ammine carbonate complexes although other compounds may also be used, e.g. formates.

The term "cobalt species" is used broadly to include both elemental cobalt and cobalt in combined form, e.g. as compounds such as cobalt oxides and cobalt hydroxycarbonates. The catalyst in its reduced form is useful for catalysing hydrogenation reactions. The catalyst may, however, be provided as a precursor wherein the cobalt is present as one or more compounds, such as oxides or hydroxy carbonates, reducible to elemental cobalt. In this form, the material may be a catalyst precursor and may be treated to reduce the cobalt compounds to metallic cobalt or the material may itself be a catalyst and used as supplied, e.g. for oxidation reactions. The cobalt surface area figures used herein apply to the material after reduction, but the invention is not limited to the provision of reduced catalyst.

Preferably the cobalt ammine complex solution is heated to decompose the complex in the presence of a catalyst support material which is selected from standard known supports such as silica (including both synthetic silica and naturally occurring forms of silica such as kieselguhr), alumina, silica-alumina, titania, zirconia, carbon, coated silicas or aluminas such as titania- or zirconia-coated silicas or aluminas for example. The catalyst of the invention is particularly suitable for use in Fischer-Tropsch (F-T) hydrocarbon synthesis and the supports preferred for cobalt catalysts for use in known cobalt F-T catalysts may be advantageously used for the catalysts of the present invention. Preferably an alumina support is present, which is most preferably a transition alumina, e.g a gamma, theta or delta alumina, so that preferred catalysts according to the invention comprise a cobalt species on a transition alumina support.

The support may be in the form of a powder or of a fabricated unit such as a granule, tablet or extrudate. Fabricated units may be in the form of elongated cylinders, spheres, lobed shapes or irregularly shaped particles, all of which are known in the art of catalyst manufacture. Alternatively the support may be in the form of a coating upon a structure such as a reactor tube wall, honeycomb support, monolith etc. Support materials may contain promoters or other materials such as binders and may be treated prior to use in the process of the invention, e.g. by drying or calcining.

Suitable transition alumina may be of the gamma-alumina group, for example a eta-alumina or chi-alumina. These materials may be formed by calcination of aluminium hydroxides at 400 to 750° C. and generally have a BET surface area in the range 150 to 400 $m^2/g$. Alternatively, the transition alumina may be of the delta-alumina group which includes the high temperature forms such as delta- and theta-aluminas which may be formed by heating a gamma group alumina to a temperature above about 800° C. The delta-group aluminas generally have a BET surface area in the range 50 to 150 $m^2/g$. The transition aluminas contain less than 0.5 mole of water per-mole of $Al_2O_3$, the actual amount of water depending on the temperature to which they have been heated. Alternatively, we have found that suitable catalyst supports may comprise an alpha-alumina.

A suitable powder for the catalyst support generally has a surface-weighted mean diameter D[3,2] in the range 1 to 200 µm. In certain applications such as for catalysts intended for use in slurry reactions, it is advantageous to use very fine particles which have a surface-weighted mean diameter D[3, 2] on average, in the range from 1 to 20 µm, e.g. 1 to 10 µm. For other applications e.g. as a catalyst for reactions carried out in a fluidised bed, it may be desirable to use larger particle sizes, preferably in the range 50 to 150 µm. The term surface-weighted mean diameter D[3,2], otherwise termed the Sauter mean diameter, is defined by M. Alderliesten in the paper "A Nomenclature for Mean Particle Diameters"; Anal. Proc., vol 21, May 1984, pages 167-172, and is calculated from the particle size analysis which may conveniently be effected by laser diffraction for example using a Malvern Mastersizer.

It is preferred that a powder support has a relatively large average pore diameter as the use of such supports appears to give catalysts of particularly good selectivity. Preferred supports have an average pore diameter (APD) of at least 10 nm, particularly in the range 15 to 30 nm. [By the term average pore diameter we mean 4 times the pore volume as measured from the desorption branch of the nitrogen physisorption isotherm at 0.98 relative pressure divided by the BET surface area]. During the production of the compositions of the invention, cobalt compounds are deposited in the pores of the support, and so the average pore diameter of the composition will be less than that of the support employed, and decreases as the proportion of cobalt increases. It is preferred that the catalysts have an average pore diameter of at least 8 nm, preferably above 10 nm and particularly in the range 10 to 25 nm.

When the support is transition alumina, it has been found that, depending on the conditions used, the bulk of the cobalt is precipitated as cobalt compounds within the pores of the transition alumina and none or only a small proportion of the cobalt is deposited as a coating round the alumina particles. As a result, irrespective of the cobalt, content of the composition, the particle size of the compositions of the invention is essentially the same as the particle size of the support, and so the compositions of the invention generally have a surface-weighted mean diameter D[3,2] in the range 1 to 200 µm, in one embodiment preferably less than 100 µm and particularly less than 20 µm, e.g. 10 µm or less, and in a second embodiment preferably in the range 50 to 150 µm.

On the other hand, since the cobalt compounds are primarily precipitated within the pores of the support, the pore volume of the compositions in accordance with the invention will be less than that of the support employed, and will tend to decrease as the cobalt species loading increases. Compositions having a total cobalt content less than 30% by weight preferably have a pore volume of at least 0.5 ml/g while compositions having a total cobalt content above 30% by weight, particularly above 40% by weight, preferably have a pore volume of at least 0.3 ml/g, particularly at least 0.4 ml/g.

The compositions of the invention, when in the reduced state, have a cobalt surface area of at least 25 $m^2/g$ of cobalt as measured by the $H_2$ chemisorption technique described herein. Preferably the cobalt surface area is greater than 30, more preferably at least 40, especially at least 60 $m^2/g$. The cobalt surface area tends to decrease as higher loadings of cobalt are used, but we have found that when the composition contains 50 to 60% by weight total cobalt in the reduced state, the cobalt surface area achievable is about 80 $m^2/g$ or more.

The cobalt surface area is determined by $H_2$ chemisorption. This method is used in the Examples, and when a cobalt surface area measurement is mentioned in this specification for the catalysts of the invention (unless otherwise specified). Approximately 0.2 to 0.5 g of sample material is firstly degassed and dried by heating to 140° C. at 10° C./min in flowing helium and maintaining at 140° C. for 60 minutes. The degassed and dried sample is then reduced by heating it from 140° C. to 425° C. at a rate of 3° C./min under a 50 ml/min flow of hydrogen and then maintaining the hydrogen flow at 425° C. for 6 hours. Following this reduction, the sample is heated under vacuum to 450° C. at 10° C./min and held under these conditions for 2 hours.

The sample is then cooled to 150° C. and maintained for a further 30 minutes under vacuum. The chemisorption analysis is then carried out at 150° C. using pure hydrogen gas. An automatic analysis program is used to measure a full isotherm over the range 100 mm Hg up to 760 mm Hg pressure of hydrogen. The analysis is carried out twice; the first measures the "total" hydrogen uptake (i.e. includes chemisorbed hydrogen and physisorbed hydrogen) and immediately following the first analysis the sample is put under vacuum (<5 mm Hg) for 30 mins. The analysis is then repeated to measure the physisorbed uptake. A linear regression is then applied to the "total" uptake data with extrapolation back to zero, pressure to calculate the volume of gas chemisorbed (V).

Cobalt surface areas were calculated in all cases using the following equation;

Co surface area=$(6.023 \times 1023 \times V \times SF \times A)/22414$ where V=uptake of H2 in ml/g SF=Stoichiometry factor (assumed 2 for $H_2$ chemisorption on Co)

A=area occupied by one atom of cobalt (assumed 0.0662 $nm^2$)

This equation is described in the Operators Manual for the Micromeretics ASAP 2010 Chemi System V 2.01, Appendix C, Part No. 201-42808-01, October 1996.

The cobalt ammine complex is most preferably a cobalt ammine carbonate complex which is formed in situ in aqueous solution by dissolving basic cobalt carbonate in a solution of ammonium carbonate in aqueous ammonium hydroxide, to give a product of the desired cobalt content. Alternatively other cobalt salts may be used, including organic salts such as cobalt acetate or cobalt formate.

A cobalt ammine carbonate complex is the product of dissolving basic cobalt carbonate, preferably of empirical formula $Co(OH)_{2-2x}(CO_3)_x$ in a solution of ammonium carbonate in aqueous ammonium hydroxide, to give a product of the desired cobalt content. The cobalt ammine carbonate solution may be made by dissolving basic cobalt carbonate in an aqueous solution of ammonium carbonate or ammonium carbamate containing additional ammonium hydroxide. The relative amounts should be such that the pH of the solution is in the range 7.5 to 12, preferably 9 to 12. The solution preferably contains-0.1 to 2.5 moles of the cobalt complex per liter. As the concentration of cobalt increases, then generally the proportion of carbonate ions relative to hydroxide ions in the basic cobalt carbonate feed should be increased. Additional ammonium hydroxide solution may be added in order to provide a slurry of handleable viscosity when support particles are mixed in.

As an alternative, the cobalt ammine carbonate solution may be made by dissolving metallic cobalt, preferably in powdered form, in aqueous ammonia of pH 11-12, in the presence of oxygen or air, either with addition of ammonium carbonate or with addition of $CO_2$ gas.

The amount of cobalt in the catalyst may be varied by varying the relative amount of cobalt and support present in the reaction mixture and by controlling the concentration of the solution of cobalt compound.

In accordance with the method of the invention, the complex solution is then allowed to oxidise either by ageing in contact with air or an oxygen-rich gas, or by chemical or electrochemical oxidation, in order that the Co(II) complex is converted, at least in part to a Co(III) complex.

The ageing may be accomplished by allowing the solution to stand in an uncovered container for the required time, preferably with stirring. The ageing by stirring in the presence of oxygen should be continued for at least 3 hours and preferably for at least 16 hours. Alternatively the solution may be oxidised by bubbling an oxygen-containing gas stream, e.g. air or oxygen, through the solution, optionally with stirring and in this case ageing may be sufficient after just one hour. Alternative methods of ageing the complex include adding an oxidising agent such as hydrogen peroxide, hypochlorite or by electrolytic ageing methods. The amount of chemical oxidant added to the solution is preferably sufficient to convert from 40% to 100% of the cobalt in the unoxidised solution, more preferably from 50-90% and especially from 60-90% of the cobalt, calculated as moles of cobalt and assuming that oxidation from $Co^{2+}$ to $Co^{3+}$ is stoichiometric. For example, where 0.65 moles of hydrogen peroxide is used to oxidise a solution containing 1.7 moles of Co, the conversion of $Co^{2+}$ to $Co^{3+}$ is 76.5%, assuming that one mole of peroxide oxidises two moles of cobalt and that the solution contains Co(II) initially. The amount of conversion of $Co^{2+}$ to $Co^{3+}$ is likely to increase as the temperature is raised. Therefore the oxidation process may be accelerated by warming the solution but the ageing is normally done at room temperature or slightly above room temperature, e.g. from about 18° C. to about 35° C.

We have found that the oxidation of the aqueous solution of cobalt ammine complex is produces an increase in net absorbance of radiation at $\lambda_{max}$ of the UV/visible spectrum occurring between 450 and 600 nm. $\lambda_{max}$ represents the height of the peak occurring between 450 and 600 nm and is measured in absorbance units relative to an interpolated baseline. The absorbance in this region increases as the extent of oxidation is increased, up to a maximum absorbance when the solution is fully oxidised. In a preferred method of the invention, the solution of cobalt ammine complex is oxidised until the absorbance at $\lambda_{max}$ of the UV/visible spectrum occurring between 450 and 600 nm is greater than 35% of the absorbance at $\lambda_{max}$ of a fully oxidised solution. More preferably the absorbance at $\lambda_{max}$ of the UV/visible spectrum occurring between 450 and 600 nm is greater than 60%, most preferably greater than 90%, and especially greater than 95%, of the absorbance at $\lambda_{max}$ of a fully oxidised solution. The standard measurement conditions utilise a Xenon light source (single beam), a path length of 1 mm, and sample temperature of 20° C.-25° C. The sample of cobalt ammine complex solution is diluted prior to spectrometry by adding 1 part of solution to 4 parts of a diluent consisting of 3 parts by volume of 30% aqueous, ammonia solution to 7 parts demineralised water. The diluent is used as the blank sample in the UV/visible spectrometry.

As a further indication of the oxidation required, we have found that the redox potential of a solution of un-oxidised cobalt ammine complex containing about 3% cobalt is approximately −300 mV at ambient temperature. We have found that the oxidation of the complex is sufficient for the method of the invention when the redox potential is between 0 V and −200 mV, more preferably from −50 to −150 mV, and most preferably about −100 mV, e.g. from −90 to −130 mV. Although the redox potential would be expected to vary with the concentration of cobalt in the solution we have found that for cobalt ammine carbonate solutions containing between about 2% cobalt and about 18% cobalt, the redox potentials of the fresh and fully oxidised solutions vary by less than 5% with concentration over the range of concentration.

As a still further indicator for performing the method of the invention, we have found that a sufficiently oxidised solution produces a pink solution when 0.2-0.5 ml (i.e. 6 drops) of solution is introduced into 60 ml of deionised water at room temperature. Preferably there is no or little precipitation during this test.

Supported cobalt catalysts may be made by impregnating a solid support in the form of a powder or a fabricated unit with a solution of the oxidised cobalt ammine carbonate complex, e.g. by spraying the support with a measured volume of the solution or by dipping the support into a volume of the solution. The impregnated support is then separated from any supernatant or excess solution and dried at a temperature in the range 60 to 110° C., so that the cobalt complex decomposes to deposit solid cobalt species upon and in the pores of the support. The impregnation and drying may be repeated several times, e.g. up to about five times, depending on the concentration of the solution and the desired cobalt loading of the support.

Supported cobalt catalysts and precursors may also be made by slurrying the powdered support, e.g. transition alumina powder, with the appropriate amount of the oxidised aqueous solution of a cobalt ammine carbonate complex, The slurry is then heated, e.g. to a temperature in the range 60 to 110° C., to cause the cobalt ammine complex to decompose with the evolution of ammonia and carbon dioxide and to deposit an insoluble cobalt compound on the surface, and in the pores, of the support. The support carrying the deposited cobalt compound is then filtered from the aqueous medium and dried. The procedure may be repeated, i.e. the dried product may be re-slurried in a solution of the cobalt ammine complex, heated, filtered and dried, if required to increase the cobalt content of the product. Using this form of the process of the invention, a catalyst having a high cobalt dispersion and a high cobalt loading, e.g. >10% cobalt, (more preferably >15% cobalt, by weight) may be prepared in a single deposition step.

The time allowed for the precipitation of the cobalt compound is normally about 30 to 200 minutes; the precipitation is usually complete after about 60 to 80 minutes, but the heating of the slurry may be prolonged to include a further precipitate-ageing step. We have found that when the cobalt content is relatively low, e.g. up to about 40% by weight, it is beneficial to use relatively short process times, e.g. by limiting the total heating time, i.e. for both the precipitation and any precipitate-ageing to 200 minutes or less, preferably less than 150 minutes. As the cobalt content of the catalyst is increased, longer process times may be used, e.g. up to about 350 minutes.

When the precipitated cobalt compound contains a mixture of $Co^{2+}$ and $Co^{3+}$ a cobalt hydrotalcite species may be formed. The hydrotalcite species has been identified by X-ray diffractometry (XRD) in which the hydrotalcite phase shows a similar diffraction pattern to known, Ni/Co hydrotalcite phases. The catalysts of the invention may be distinguished by the ratio of cobalt hydrotalcite to cobalt spinel found in the precipitated cobalt species after drying at less than 160° C. i.e. at a temperature less than the temperature at which $Co_3O_4$ is formed from cobalt nitrate by calcination. The cobalt hydrotalcite may be represented as $[Co^{2+}/Co^{3+}](OH)CO_3$ in which the ratio of $Co^{2+}:Co^{3+}$ is about 3:1. The cobalt spinel has an empirical formula of $Co_3O_4$ so contains more $Co^{3+}$ than $Co^{2+}$. The amount of hydrotalcite and cobalt spinel may be determined by XRD. Preferred catalysts of the invention have a ratio of cobalt hydrotalcite: cobalt spinel of less than 0.6:1, more preferably less than 0.5:1, especially less than 0.3:1. The cobalt spinel is calculated from the powder diffraction peaks $Co_3O_4$ 111 at 19.0° 2θ (=4.667 Å) and $Co_3O_4$ 311 at 36.845° 2θ(=2.4374 Å). The cobalt hydrotalcite is estimated from the diffraction pattern in the patterns published by the International Centre for Diffraction Data ICDD No 00-040-0216 for cobalt nickel carbonate hydroxide hydrate $Ni_{0.75}Co_{0.25}(CO_3)_{0.125}(OH)_2.0.38H_2O$ using the ICDD No 00-040-0216 for cobalt nickel carbonate hydroxide hydrate $Ni_{0.75}Co_{0.25}(CO_3)_{0.125}(OH)_2.0.38H_2O$ using the 7.628 Å (11.591° 2θ), 3.84 Å (23.143° 2θ), 2.565 Å (34.952° 2θ), 2.285 Å (39.401° 2θ), 1.936 Å (46.89° 2θ), 1.734 Å (52.747 Å 2θ), 1.639 Å (56.065° 2θ), 1.521 Å (60.853° 2θ) signals. The cobalt hydrotalcite is most particularly identified using the 7.628 Å (11.591° 2θ) and 3.84 Å (23.143° 2θ). The ratio of cobalt hydrotalcite:cobalt spinel is estimated from the ratio of the peak areas. Note that there was no nickel present in the catalysts, the Co/Ni hydrotalcite diffraction pattern was used only to approximate that for the $Co^{2+}Co^{3+}$ hydrotalcite.

We have found that when the cobalt species is precipitated in the spinel form compared with the hydrotalcite form, the dispersion of the cobalt, and therefore the cobalt metal surface area is greater when the catalyst is reduced in hydrogen to convert the cobalt compounds into metallic cobalt. It is therefore preferred to maximise the amount of cobalt compound precipitated in spinel form. In contrast, catalysts prepared by impregnation of cobalt nitrate onto a support always deposit cobalt as $Co^{2+}$ because of the acidic nature of the cobalt nitrate solution. Therefore no hydrotalcite or spinel is formed and the dried cobalt nitrate must be calcined to form the oxide before reduction in hydrogen.

According to a further aspect of the invention we provide a catalyst intermediate comprising a cobalt compound, said cobalt compound comprising a Co(II)/Co(III) hydrotalcite phase and a $Co_3O_4$ cobalt spinel phase, wherein the ratio of cobalt hydrotalcite phase: cobalt spinel phase is less than 0.6:1, the amount of said cobalt hydrotalcite phase and said cobalt spinel phase being measured by X-ray diffractometry. The catalyst intermediate may be used as a catalyst but normally is subjected to a further process such as the reduction of the cobalt species in a hydrogen-containing gas to provide a catalyst comprising metallic cobalt. The catalyst intermediate may be obtained using the method of the invention. The catalyst intermediate preferably comprises a support as described above.

For some applications it may be desired to incorporate modifiers, such as other metals or compounds thereof, into the catalyst or precursor. This may be effected by impregnating the dried product with a solution of a compound of the desired modifier that decomposes to the oxide or elemental form upon heating. Examples of such modifiers include alkali metals, precious metals, and transition metals. Common promoters used in cobalt catalysts for Fischer Tropsch processes include manganese, platinum, ruthenium and rhenium.

If desired, the product may be calcined in air, e.g. at a temperature in the range 200 to 600° C., more preferably 200 to 450° C., to decompose the deposited cobalt compound to cobalt oxide. However we have found that using the method of the invention a significant part of the cobalt species formed by the decomposition of the cobalt ammine complex is $Co_3O_4$ and therefore no calcination step is required in order to remove e.g. $CO_2$, water or nitrogen species. Therefore the deposited cobalt compound may be directly reduced, i.e. without the need for a calcination step. Upon reduction of the cobalt oxide, the high cobalt surface area is generated. The reduction, whether or not a preliminary calcination step is employed, may be effected by heating to a temperature in the range from about 200° C. to about 600° C. in the presence of hydrogen. In the reduced material it is preferred that at least 50% of the cobalt is present as metallic cobalt.

The composition may be used in its oxidic state, i.e. without reducing the cobalt oxides to metallic cobalt. It may be used as a catalyst in this state for e.g. oxidation reactions. Alternatively and preferably, the catalyst is reduced to an active catalyst containing cobalt metal by the end-user. The composition may alternatively be supplied as a reduced catalyst which has been passivated, so that the cobalt metal is protected from deactivation during storage and transportation. Thus a precursor comprising the support and the unreduced cobalt compound, possibly dispersed in a carrier, may be charged to a hydrogenation reactor optionally with the material to be hydrogenated and the mixture heated while hydrogen is sparged through the mixture.

The catalysts may be used for hydrogenation reactions such as the hydrogenation of olefinic compounds, e.g. waxes, nitro or nitrile compounds, e.g. the conversion of nitrobenzene to aniline or the conversion of nitriles to amines. They may also be used for the hydrogenation of paraffin waxes to remove traces of unsaturation therein. They may also be useful in a wide range of other reactions, for example the Fischer-Tropsch process, i.e. where hydrogen and carbon monoxide are reacted in the presence of the catalyst to form higher hydrocarbons. This may be part of an overall process for the conversion of natural gas to petroleum compounds wherein the hydrogen/carbon monoxide gas mixture is a synthesis gas formed by steam reforming natural gas.

GENERAL METHOD OF CATALYST PREPARATION FOR EXAMPLES 1-10

The cobalt ammine carbonate complex solution was made up using 1707 g ammonia solution (SG 0.89, 30% ammonia), 198 g ammonium carbonate, 218 g basic cobalt carbonate (46.5% wt % Co, bulk density 0.640 g/ml) and 1877 g demineralised water. The solution was stirred for one hour in order to dissolve the basic cobalt carbonate. The total volume of solution was 4 liters. The solution was oxidised as described in the following examples before using to make cobalt catalysts as described below.

The alumina employed was Puralox™ HP14/150 available from Sasol, which is a transition-alumina of the gamma alumina type having a particle size $D_{50}$ of 48-50 μm. The alumina was used as received.

The alumina particles and a measured amount of the cobalt ammine carbonate complex solution were charged to a stirred vessel equipped with a condenser. The relative amounts of alumina and cobalt ammine carbonate complex solution were calculated to provide a catalyst containing 40% by weight of cobalt metal in the oxidic catalyst. The pH of the aqueous solution was 11.1. The mixture was heated to boiling while stirring and gentle boiling at about 96° C. to about 100° C. was maintained until a pH of between 7.5 and 7.7 was achieved, during which the solution becomes clear. The solid was then filtered off, briefly washed in water and then dried in air at 105° C. overnight.

The cobalt surface area of the catalysts was measured by reduction in a flowing hydrogen stream at 425° C. followed by $H_2$ chemisorption at 150° C. using the standard method described earlier.

Temperature programmed reduction (TPR) of the dried materials was carried out in a reduction gas stream comprising 5% hydrogen in nitrogen. The sample (between 0.1 and 0.15 g, accurately weighed) was first heated to 120° C. (at 5° C./min under a reduction gas flow of 25 ml/min) to remove moisture and held at 120° C. for 45 minutes. Thereafter the sample was heated from 120 to 1000° C. in the reduction gas stream at a heating rate of 5° C. per minute. The change in concentration of hydrogen between the inlet gas and the outlet gas was monitored by a katharometer to show the consumption of hydrogen at each temperature. The TPR instrument used was Quantachrome ChemBet® TPR/TPD analyser. The TPR traces are shown in FIGS. 1 to 4 and 6 to 8.

The cobalt surface area was measured according to the standard hydrogen chemisorption procedure described above.

UV-vis spectra were acquired at ambient temperature using a Varian Cary 50 spectrophotometer, equipped with a Xenon flash lamp, using a cell path length of 1 mm. The sample of cobalt ammine solution is diluted prior to spectrometry by adding 1 part of solution to 4 parts of a diluent consisting of 3 parts by volume of 30% aqueous ammonia solution to 7 parts demineralised water. The diluent is used as the blank sample in the UV/visible spectrometry.

EXAMPLE 1 (COMPARATIVE)

The cobalt ammine carbonate solution was used immediately after dissolution of the basic cobalt carbonate solids was complete. The cobalt crystallite size in the catalyst was measured using X-ray diffraction during an in-situ reduction procedure. The cobalt metal crystallites formed at reduction temperatures between about 400° C. and about 600° C. had an average crystallite size of 6-10 nm, based upon the 200 reflection.

EXAMPLE 2

The cobalt ammine carbonate solution was oxidised with stirring in contact with air for 3 hours prior to preparation of the catalyst.

EXAMPLE 3

The cobalt ammine carbonate solution was oxidised with stirring in contact with air for 16 hours and then stored without stirring in a container for 48 hours, allowing air to enter the container periodically throughout the storage time. The cobalt metal crystallites formed at reduction temperatures between about 400 degrees and about 600 degrees had an average crystallite size of 4-5 nm, based upon the 200 reflection.

EXAMPLE 4

The cobalt ammine carbonate solution was stirred whilst air was continuously bubbled through the solution for one hour prior to preparation of the catalyst.

Figure 1:
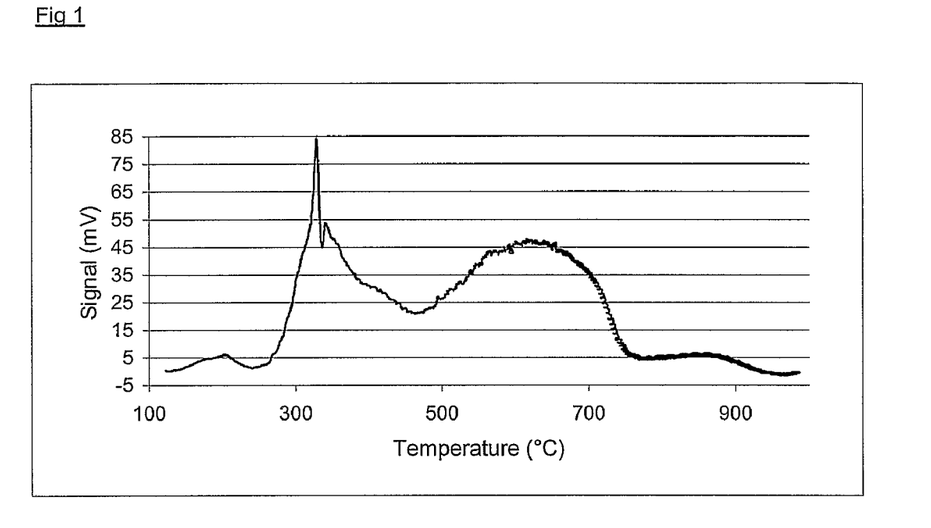
FIG. 1: Temperature programmed reduction trace of signal vs temperature for catalyst made according to Example 1.
Figure 2:
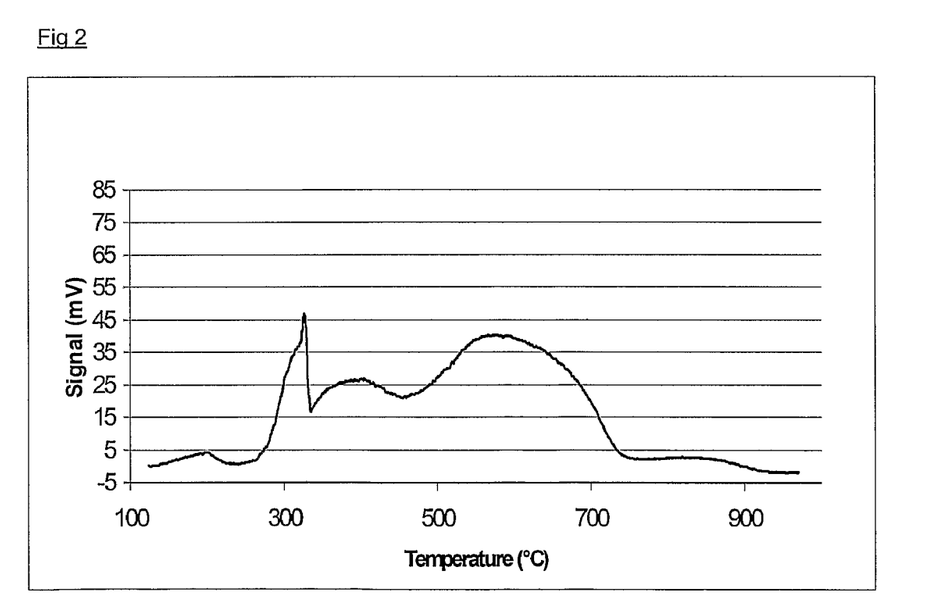
FIG. 2: Temperature programmed reduction trace of signal vs temperature for catalyst made according to Example 2.
Figure 3:
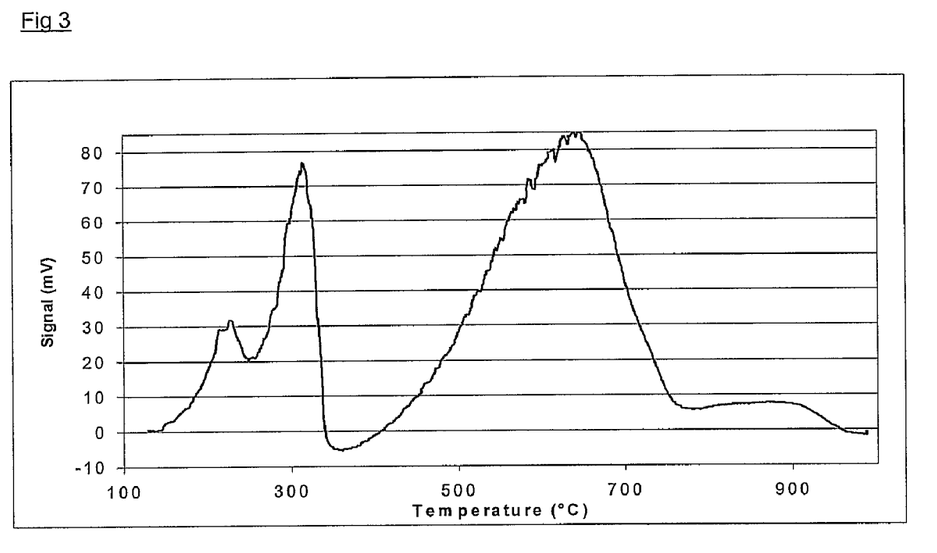
FIG. 3: Temperature programmed reduction trace of signal vs temperature for catalyst made according to Example 3.
Figure 4:
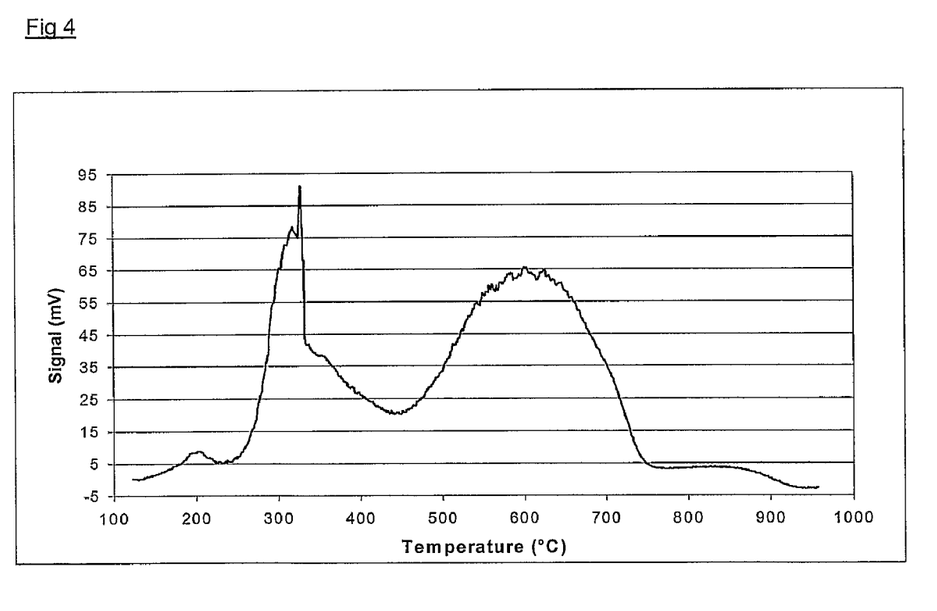
FIG. 4: Temperature programmed reduction trace of signal vs temperature for catalyst made according to Example 4.

The TPR traces for Examples 1-2 (in FIGS. 1-2) show a reduction taking place between about 350° C. and 400° C. This reduction is absent from the trace measured for Example 3 (FIG. 3) which has the highest cobalt surface area. In FIG. 4 some reduction at this temperature appears to take place, visible as a shoulder on the 300° C. reduction peak. Reduction between about 350° C. and 400° C. is currently believed to be associated with reduction of a cobalt hydrotalcite phase.

EXAMPLE 5

The cobalt ammine carbonate solution was stirred for one hour and air was bubbled through the solution for 5 minutes every 15 minutes prior to preparation of the catalyst.

TABLE 1

| Example | Ageing of solution | Cobalt metal surface area ($m^2$/g Co) |
| --- | --- | --- |
| 1 | None | 51.7 |
| 2 | Stir 3 hours | 52.7 |
| 3 | Stir 16 hrs, store 48 hours | 57.9 |
| 4 | Constant air purge 1 hour | 57.1 |
| 5 | Intermittent air purge 1 hour | 52.7 |

EXAMPLE 6

Figure 5:
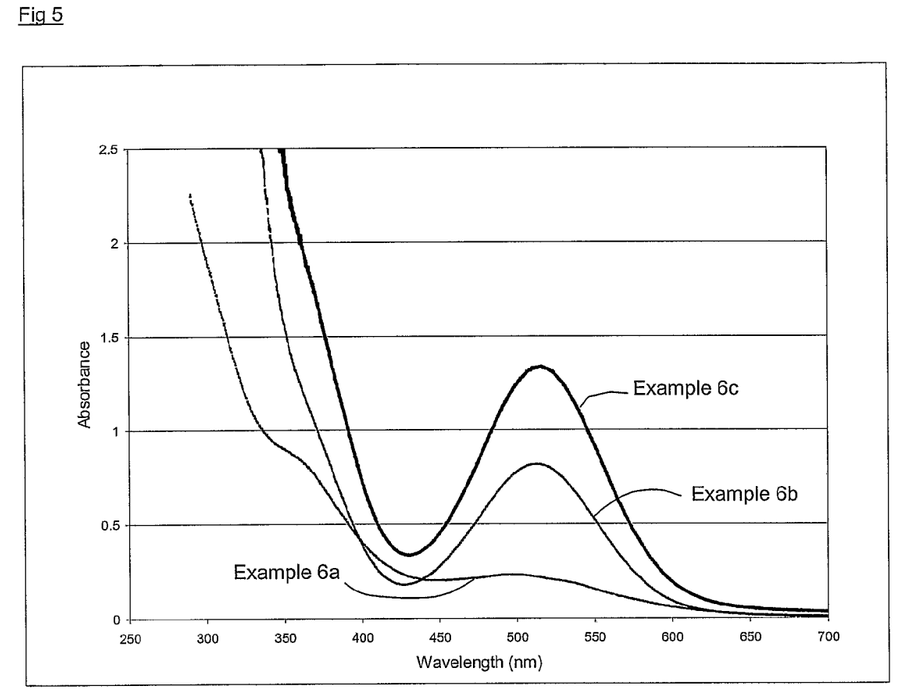
FIG. 5: UV-visible spectrograph of solutions produced in Example 6.

A cobalt ammine carbonate solution was made up as described earlier. One portion, designated 6*a* was stirred in air for 3 hours. A second portion, 6*b*, was stirred for 16 hours. A third portion, 6c, was allowed to stand, with occasional air ingress, for 30 days. The solutions were analysed using UV-visible spectroscopy. The spectra are shown in FIG. 5. It can be seen that the portion of the spectrum between about 450 nm and 600 nm shows an increase in absorbance as the amount of oxidation is increased.

EXAMPLE 7

Figure 6:
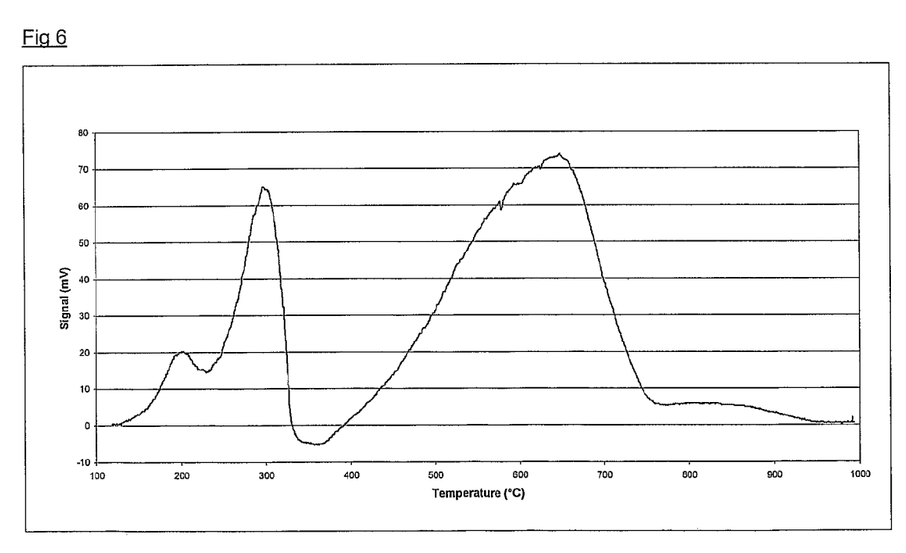
FIG. 6: Temperature programmed reduction trace of signal vs temperature for catalyst made according to Example 7.
Figure 7:
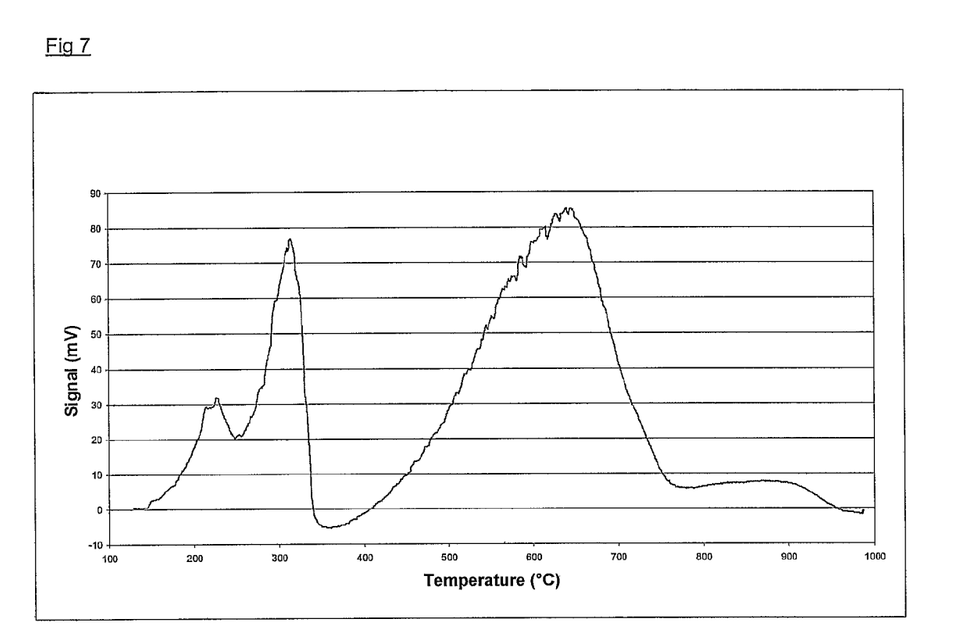
FIG. 7: Temperature programmed reduction trace of signal vs temperature for catalyst made according to Example 8.

To a 4 liter batch of cobalt ammine carbonate solution made according to the general process given above was added approximately 50-60 ml of 30% hydrogen peroxide dropwise with stirring until 6 drops (about 0.5 ml) of the solution mixed in 60 ml demineralised water resulted in a pink solution with only minimal precipitation, indicating that sufficient oxidation of the solution had occurred to give mainly $Co^{3+}$. The same test on insufficiently oxidised solution results in a blue colour solution and a precipitate. The solution was filtered and catalysts were prepared according to the method given above and the properties were measured using the same methods. The results are shown in Table 2. The TPR trace for the catalyst is shown in FIG. 6.

EXAMPLE 8

A 4-liter batch of cobalt ammine carbonate solution made according to the general process was left standing in static air for 8 days. The solution was filtered and catalysts were prepared according to the method given above and the properties were measured using the same methods. The TPR trace is shown as FIG. 7. The results are shown in Table 2.

EXAMPLE 9

Figure 8:
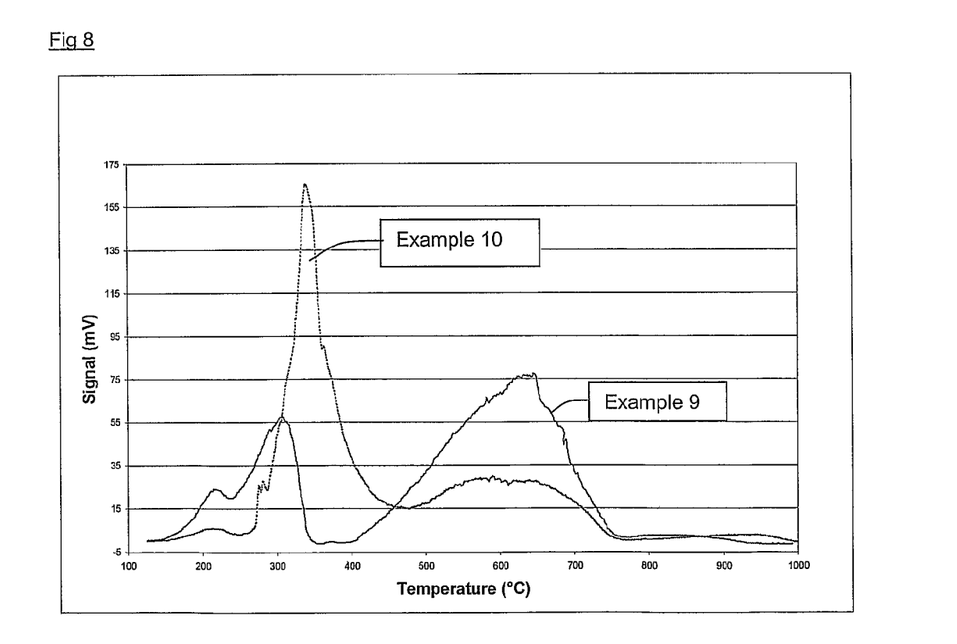
FIG. 8: Temperature programmed reduction trace of signal vs temperature for catalyst made according to Example 9 & 10.

A 32 liter batch of cobalt ammine carbonate solution was made using the general method above using ingredients in the same proportions as that given for the general method above. The solution was filtered and then a 30% hydrogen peroxide solution was pumped into the solution until the Redox potential changed from approximately −300 (before $H_2O_2$ addition) to −100 mV. The Redox potential was measured using a Mettler Toledo pH transmitter 2500. Catalysts were prepared according to the method given above and the properties were measured using methods described above. The TPR trace is shown in FIG. 8. The results are shown in Table 2.

EXAMPLE 10 (COMPARISON)

A second 32 liter batch of cobalt ammine carbonate solution was made and filtered in the same way as described in Example 9. Catalysts were made by the general method given without waiting for the solution to oxidise or adding hydrogen peroxide or other oxidant. The results are shown in Table 2. The TPR trace is shown in FIG. 8.

EXAMPLE 11 (COMPARATIVE)

Preparation of Cobalt Catalysts Supported on Alumina-Extrudates Preparation of Cobalt Ammine Carbonate Solution Ammonium carbonate chip (634 g), (30-34 w/w % $NH_3$), was weighed into a 3 liter round bottomed, flask and ammonia solution (~30%) (1880 ml) BDH 'Analar' Sp.Gr. 0.89 added. The mixture was continually stirred-overnight to ensure that the ammonium carbonate chip had dissolved. Cobalt basic carbonate (528 g), (45-47 w/w % Co), was added in aliquots over 60 minutes. The final solution was stirred continually for approximately 30 minutes before filtering to remove any traces of insoluble particulate matter. Solution pH was 10.95 and Co content was 14.3%. The solution was used immediately after filtering to carry out three impregnations onto an alumina extrudate support.

Alumina extrudates of 1.2 mm diameter were calcined at 1050° C. for 2 hours. 200 g alumina extrudates were placed in a 2 liter round bottom flask. An amount of the prepared cobalt ammine carbonate solution was added to the extrudates such that the extrudates were completely covered. The mixture was swirled occasionally for 5 minutes before decanting off excess solution. The impregnated extrudates were filtered to remove any remaining solution then dried at 110° C. for 2-4 hours. After drying the impregnation procedure was repeated twice more and the thrice-impregnated extrudates were dried for 16 hours at 110° C.

EXAMPLE 12

A portion of the solution made in Example 11 was oxidised by allowing it to stand with access to air for 48 hours. 200 g of alumina extrudates were impregnated using the method of Example 11 for one impregnation only. After filtration, the impregnated extrudates were dried for 16 hours at 110° C.

EXAMPLE 13

A portion of the dried extrudates made in Example 12 were impregnated in a further portion of the solution of Example 11 which had been allowed to stand in air for a total period of 21 days. The resulting twice-impregnated extrudates were dried for 16 hours at 110° C.

EXAMPLE 14

A portion of the dried extrudates made in Example 13 were impregnated in a further portion of the solution of Example 11 which had been allowed to stand in air for a total period of 24 days. The resulting thrice-impregnated extrudates were dried for 16 hours at 110° C. Analysis of the prepared catalysts was carried out as described in Example 1 and the results are shown in Table 3.

TABLE 2

| Example | Oxidation of solution | Cobalt metal surface area ($m^2$/g Co) | % w/w Co (oxidic) |
|---|---|---|---|
| 7 | $H_2O_2$ to colour change | 54.2 | 41.8 |
| 8 | Static air ageing 8 days | 61.9 | 35.9 |
| 9 | $H_2O_2$ to −100 mV Redox potential | 59.1 | 42.8 |
| 10 | None (comparison) | 43.5 | 36.9 |

TABLE 3

| Example | description | Cobalt metal surface area ($m^2$/g Co) | % w/w Co (oxidic) |
|---|---|---|---|
| 11 | No ageing 3 dips (comparison) | 83.0 | 10.6 |
| 12 | 2 days ageing, 1 dip | 62.2 | 6.58 |
| 13 | 21 days ageing, 2 dips | 79.2 | 10.3 |
| 14 | 24 days ageing, 3 dips | 88.4 | 13.6 |

EXAMPLE 15

Preparation of Cobalt Catalysts on Alumina Extrudates 634 g ammonium carbonate chip, ex Brotherton Speciality Products Limited (30-34 w/w % $NH_3$) and 1880 ml ammonia solution (~30%) BDH 'Analar' Sp.Gr. 0.89 were placed in the flask. The mixture was continually stirred overnight to ensure that the ammonium carbonate chip had dissolved. 1056 g cobalt basic carbonate, ex Shepherd Widnes Ltd. (45-47 w/w % Co), was added in aliquots over 60 minutes, whilst continually stirring the solution, and allowed to dissolve. Slow addition was used to prevent any heat build up during dissolution of the cobalt powder. The final solution was stirred continually for 48 hours with air access before filtering to remove any undissolved cobalt carbonate. Filtration took 48 hours as the solution was extremely viscous. The solution pH was 10.3 and the Co content was measured as 20.5%.

200 g $Al_2O_3$ extrudates (as used in Examples 11-14) were placed in a 2 liter round bottomed flask and the impregnation procedure carried out as described in Example 11. The three impregnations were carried out on successive days and so the ageing of the solution for each impregnation was 4, 5 and 6 days. The results are shown in Table 4.

EXAMPLE 16

The preparation of Example 15 was repeated but the solution was oxidised for a different time. By the time of the third impregnation, it was noted that the solution had become more viscous, possibly due to loss of ammonia. The results are shown in Table 4. It is notable that it appears possible to prepare a catalyst containing more than 20% of cobalt by this method.

TABLE 4

| Example | description | Cobalt metal surface area ($m^2$/g Co) | % w/w Co (oxidic) |
| --- | --- | --- | --- |
| 15A | 4 days ageing 1 dip | 81.5 | 9.84 |
| 15B | 5 days ageing, 2 dip | 87.0 | 13.9 |
| 15C | 6 days ageing, 3 dips | 92.9 | 16.2 |
| 16A | 5 days ageing, 1 dip | 96.4 | 11.5 |
| 16B | 6 days ageing, 2 dip | 83.7 | 15.1 |
| 16C | 17 days ageing, 3 dips | 72.8 | 20.1 |

EXAMPLE 17

Pt-Promoted Catalyst

Example 15C was repeated and the resulting catalyst was impregnated with a platinum compound. 0.0806 g platinum (II) 2,4-pentandionate, equivalent to 0.04 g or 0.1 wt % Pt, was dissolved in 27 ml acetone. The dried catalyst was placed in a flask and the platinum solution was added drop-wise whilst agitating the flask gently. Sufficient of the dried catalyst 15C was used so that the platinum solution was sufficient to fill the pores of the catalyst with a slight excess. After impregnation, the extrudates were allowed to stand in a fume cupboard for 2 hours to evaporate the solvent prior to drying at 105° C. for 16 hours. Analysis gave the following results: Cobalt=17.6% (by ICP-AES)

Platinum 0.10% (by ICP-AES)

Co metal surface area=94.5 $m^2$/g cobalt

EXAMPLE 18

Cobalt on Silica Extrudates 634 g ammonium carbonate chip, (30-34 W/w % $NH_3$) and 1880 ml ammonia solution (30%) BDH 'Analar' Sp.Gr. 0.89 were placed in the flask. The mixture was continually stirred overnight to ensure that the ammonium carbonate chip had dissolved. 1056 g cobalt basic carbonate, (45-47 W/w % Co), was added in aliquots over 10 hours, whilst continually stirring the solution, and allowed to dissolve with air access for 16 hours. Slow addition was used to prevent any heat build up during dissolution of the cobalt powder. The resulting viscous solution was filtered to remove any undissolved cobalt carbonate. Oxidation of the complex solution was achieved by adding 150 ml hydrogen peroxide to the solution after filtration. The solution contained 19.7% Co and had a pH of 11.5.

Approximately 100 g of silica extrudates, (cylindrical, diameter 1.5 mm, length 2-10 mm, KL7200 CY silica extrudates from CRI Kata Leuna.), having a pore volume of 1.1 $cm^3g^{-1}$ as measured by water uptake, were placed in a 1 liter round bottom flask. Sufficient quantity of the prepared and oxidized cobalt ammine carbonate solution was added to the extrudates to completely immerse them. The mixture was swirled occasionally for 10 minutes at ambient temperature before filtering off excess solution and drying at 105° C. for 16 hours. After drying the impregnation procedure was repeated. Samples were saved after each impregnation. The properties of the resulting catalysts were measured as noted previously and are shown in Table 5.

EXAMPLE 19

Cobalt on Zirconia Coated Silica Extrudates 30 g of a solution of aqueous ammonium zirconium carbonate solution containing Zr equivalent to 20% of $ZrO_2$ (supplied by MEL chemicals of Manchester England) was diluted to 99 ml with demineralised water. The quantity and concentration of solution was calculated to provide approximately 6 g of $ZrO_2$ per 100 g of silica extrudates and to fill 90% of the pore volume of the silica extrudates. 100 g $SiO_2$ extrudates as used in Example 15 was placed into the vessel of a Pascall Lab-Mixer and tumbled at half speed for 10 minutes whilst adding the $ZrO_2$ solution drop-wise. When all the $ZrO_2$ solution had been added the vessel was enclosed and tumbled for a further 10 minutes at ¾ speed. Finally, the support was dried at 105° C. for 16 hours and calcined at 400° C. for 4 hours. During the drying and calcination stages ammonia and carbon dioxide are evolved leading to deposition of $ZrO_2$ onto the support.

100 g of the resulting zirconia coated silica extrudates were then impregnated with the cobalt ammine carbonate solution as described in Example 18. The properties of the resulting catalysts were measured as noted previously and are shown in Table 5. The results show that the dispersion of cobalt is greater on the zirconia-coated silica than on the untreated silica extrudates.

TABLE 5

| Example | Description | Cobalt metal surface area ($m^2$/g Co) | % w/w Co (oxidic) | % w/w Co (reduced) |
|---|---|---|---|---|
| 18 | Silica support, 1 impregnation | 32.9 | 13.5 | 17.3 |
| 18 | Silica support, 2 impregnations | 39.0 | 18.5 | 22.8 |
| 18 | Silica support, 3 impregnations | 34.8 | 21.2 | 29.0 |
| 18 | Silica support, 4 impregnations | 36.2 | 22.9 | 31.8 |
| 19 | $ZrO_2$-coated silica, 1 impregnation | 28.9 | 13.1 | 15.6 |
| 19 | $ZrO_2$-coated silica, 2 impregnations | 46.1 | 17.1 | 23.4 |
| 19 | $ZrO_2$-coated silica, 3 impregnations | 45.2 | 19.7 | 27.0 |
| 19 | $ZrO_2$-coated silica, 4 impregnations | 42.7 | 21.2 | 29.0 |

EXAMPLE 20

Cobalt on Silica Powder 1880 ml of demineralised water and 1920 ml of ammonia were measured into a 5-liter round bottomed flask to which 198 g of ammonium carbonate chips were added and stirred at 350 rpm until the chips dissolved. Once the chips had dissolved 218 g of cobalt carbonate was added and left to stir over night. The solution was then filtered and left in an open bottle for 2 days to age and then stored in a closed bottle.

2 liters of the solution was measured into a 3-liter round bottom flask on a heating mantle and set to stir. 43.5 g of amorphous silica powder (Ineos) was added and the pH of the solution measured. The solution was heated to boiling and the pH, temperature and colour of the solution was measured every 15 minutes. When the pH of the solution was found to be in the range of 7.5 to 7.7 the deposition of cobalt was stopped. The remaining solution was filtered off and the filter cake was washed with 2 liters of demineralised water. The resultant powder was then dried in the oven overnight at 110° C. Once dry, the powder was put through a 1 mm sieve to break down any large mass of catalyst.

The surface area and average pore diameter (APD) of the silica and the resultant catalysts were measured by nitrogen physisorption.

EXAMPLE 21

Co on Zr-Coated Silica Powder 100 g of amorphous silica powder from INEOS was weighed into a 1 L glass beaker. 41.4 g of a solution of zirconium nitrate containing 19.5% $ZrO_2$ was weighed into a sample bottle along with 268.2 g of demineralised water and mixed. The zirconium nitrate solution was then added to the silica in small aliquots and stirred by hand until all the zirconium nitrate solution was worked into the silica. This gave a silica powder at incipient wetness. The sample was then spread evenly on a stainless steel tray and covered and placed in a oven where the temperature was ramped at 2° C. per minute to 120° C. were it was held for 3 hours and then ramped at 2° C. per minute to 450° C. where it was held for a further 4 hours.

Catalysts were made using the method of Example 20 using the $ZrO_2$-coated silica powder as support instead of the un-coated silica.

The % Zr of the coated samples was measured by ICP-AES methodology. The cobalt surface areas of the reduced catalysts were measured by $H_2$ chemisorption as described earlier and the results reported on the oxidic catalyst are shown in Table 6.

TABLE 6

| | | Catalyst | | | | | | | |
|---|---|---|---|---|---|---|---|---|---|
| | | Support | | Reduced catalyst | Oxidic catalyst | | | | |
| Example | % Zr (wt %) | BET surface area ($m^2g^{-1}$) | Pore Vol [0.98des] ($cm^3g^{-1}$) | Co Surface area ($m^2g^{-1}$ cat) | BET surface area ($m^2g^{-1}$) | Pore Vol ($cm^3g^{-1}$) | APD (Å) | Particle size D[v, 0.5] (µm) | % Co (wt %) |
| 20 | 0 | 280.9 | 1.57 | 25.5 | 341.6 | 0.34 | 40 | 48.9 | 42.2 |
| 21 | 5.3 | 262.3 | 1.38 | 22.4 | 303.8 | 0.39 | 39 | 51.4 | 42.6 |

EXAMPLE 22

Determination of Hydrotalcite and Spinel Phases in Deposited Cobalt Compound

Catalysts containing 20% and 40% cobalt were made using the procedure of Example 1. Samples were made using fresh solutions and oxidised solutions (static air ageing for 8 days). The support used was Puralox HP14/150 gamma alumina and the amount of cobalt in the catalyst was varied by varying the amount of support added to the cobalt ammine solution. When the pH of the mixture of Co ammine solution and support had been reduced to about 7.5 by boiling, the solid catalyst particles were collected by filtration and a sample analysed by XRD.

The sample was mounted in an XRD holder in its wet state and covered with a PET dome to prevent oxidation. XRD analysis was performed on a Siemens D5000 theta-theta X-ray diffractometer equipped with a Baltic Scientific Instruments Sol-X Energy Dispersive detector. Copper Kα radiation was used. All scans were done at room temperature. The XRD specimens were prepared under nitrogen in standard bulk front fill holders.

The X-ray beam divergence was controlled by a programmable slit to give 12 mm length illumination of the specimen surface. A 0.6 mm receiving slit was used together with primary soller slits. The data was collected for an angular range of 2-75° 2θ. A rapid scan, for initial measurements with and without a PET dome, step size of 0.1° 2θ and a count time per step of 1 second and a slower scan with and without dome with a step size of 0.05020 and a count time per step of 1.2 seconds. The scans run with the dome were simply used to confirm that evidence of the oxidation of the sample in the instrument was absent.

The Powder Diffraction File™ issued by the International Centre for Diffraction Data, was used as a reference for powder diffraction data. The $CO_3O_4$ spinel pattern from ICDD No 00-043-1003 was used for identification and for calculation of concentrations ($CO_3O_4$ 111 at 19.0° 2θ (=4.667 Å) and $CO_3O_4$ 311 at 36.845° 2θ (=2.4374 Å)).

There was no database phase for a $Co^{2+}Co^{3+}$ hydrotalcite available, but the pattern for the corresponding Ni/Co phase corresponded quite closely. The "hydrotalcite-type" pattern used for identification and concentration calculations was ICDD No 00-040-0216 for cobalt nickel carbonate hydroxide hydrate $Ni_{0.75}Co_{0.25}(CO_3)_{0.125}(OH)_2 0.38H_2O$ using the 7.628 Å (11.591° 2θ), 3.84 Å (23.143° 2θ), 2.565 Å (34.952° 2θ), 2.285 Å (39.401° 2θ), 1.936 Å (46.89° 2θ), 1.734 Å (52.747° 2θ), 1.639 Å (56.065° 2θ), 1.521 Å (60.853° 2θ) signals. Note that there was no nickel present in the catalysts, the Co/Ni hydrotalcite diffraction pattern was used only to approximate that for the $Co^{2+} Co^{3+}$ hydrotalcite.

The hydrotalcite phase/spinel phase in the catalysts calculated by this procedure is shown in Table 7. The "wet" samples are measured after filtration but without drying. The "dry" samples are measured after drying in ambient air overnight.

TABLE 7

| % Co | Solution oxidation | Hydrotalcite/spinel |
| --- | --- | --- |
| 40 (wet) | oxidised | 0.2 |
| 40 (dry) | oxidised | 0.2 |
| 20 (wet) | oxidised | 0.5 |
| 20 (dry) | oxidised | 0.25 |
| 40 | Not oxidised | 1.1 |

The invention claimed is:

1. A method of manufacturing a catalyst, comprising the steps of:
   (i) forming an aqueous solution of a cobalt ammine carbonate complex at a pH in the range 7.5 to 12,
   (ii) mixing the cobalt ammine complex solution with a solid catalyst support selected from the group consisting of alumina, silica, silica-alumina, zirconia, titania, titania-coated silica, titania-coated alumina, zirconia-coated silica or zirconia-coated alumina prior to heating the solution,
   (iii) oxidizing the solution of cobalt ammine complex by adding to the solution a solution of hydrogen peroxide or a hypochlorite sufficient to convert from 50-90% of the cobalt, calculated as moles of cobalt, from Co(II) to Co(III), and then
   (iv) decomposing the cobalt ammine complex by heating the solution to a temperature between 80 and 110° C. for sufficient time to allow an insoluble cobalt compound to precipitate out of the solution,
   (v) filtering the precipitated cobalt compound from the solution,
   (vi) drying the precipitated cobalt compound at a temperature less than 160° C. to form a catalyst intermediate comprising a cobalt compound and said catalyst support, said cobalt compound comprising a Co(II)/Co(III) hydrotalcite phase and a $Co_3O_4$ cobalt spinel phase, wherein the ratio of cobalt hydrotalcite phase: cobalt spinel phase is less than 0.6:1, said cobalt hydrotalcite phase and said cobalt spinel phase being measured by X-ray diffractometry, and
   (vii) without calcining in air, reducing at least a part of the cobalt compound to metallic cobalt in a stream of hydrogen-containing gas.

2. A method as claimed in claim 1, wherein the aqueous solution of a cobalt ammine complex is oxidised until the absorbance at $\lambda_{max}$ of the UV/visible spectrum occurring between 450 and 600 nm is greater than 35% of the absorbance at $\lambda_{max}$ of a fully oxidised solution.

3. A method as claimed in claim 2, wherein the aqueous solution of a cobalt ammine complex is oxidised until the absorbance at $\lambda_{max}$ of the UV/visible spectrum occurring between 450 and 600 nm is greater than 60% of the absorbance at $\lambda_{max}$ of a fully oxidised solution.

4. A method as claimed in claim 3, wherein the aqueous solution of a cobalt ammine complex is oxidised until the absorbance at $\lambda_{max}$ of the UV/visible spectrum occurring between 450 and 600 nm is greater than 90% of the absorbance at $\lambda_{max}$ of a fully oxidised solution.

5. A method as claimed in claim 1, wherein the oxidised solution has a Redox potential of at least −200 mV.

6. A method as claimed in claim 5, wherein the oxidised solution has a Redox potential of from −50 to −150 mV.

7. A method as claimed in claim 1, wherein the catalyst contains from 3 to 85% by weight of total cobalt.

8. A method as claimed in claim 1, wherein the support material is a powder or fabricated unit comprising alumina.

9. A method as claimed in claim 8, wherein the alumina powder has a mean particle size, $D_{50}$ in the range 1 μm to 200 μm.

10. A method as claimed in claim 8 wherein the catalyst has a total cobalt content above 20% by weight and wherein the support is a gamma, theta or delta alumina.

11. A method as claimed in claim 1, wherein the ratio of cobalt hydrotalcite phase:cobalt spinel is less than 0.5:1.

12. A method as claimed in claim 11, wherein the ratio of cobalt hydrotalcite phase:cobalt spinel is less than 0.3:1.

13. A method as claimed in claim 1, wherein the step of reducing the cobalt species to metallic cobalt in the stream of the hydrogen-containing gas occurs at a temperature in the range 200-600° C.

14. A catalyst intermediate comprising a cobalt compound and a catalyst support selected from the group consisting of alumina, silica, silica-alumina, zirconia, titania, titania-coated silica, titania-coated alumina, zirconia-coated silica, and zirconia-coated alumina, said cobalt compound comprising a Co(II)/Co(III) hydrotalcite phase and a $Co_3O_4$ cobalt spinel phase, wherein the ratio of cobalt hydrotalcite phase: cobalt spinel phase is less than 0.6:1, said cobalt hydrotalcite phase and said cobalt spinel phase being measured by X-ray diffractometry.

15. A catalyst intermediate as claimed in claim 14, wherein the ratio of cobalt hydrotalcite phase:cobalt spinel is less than 0.5:1.

16. A catalyst intermediate as claimed in claim 15, wherein the ratio of cobalt hydrotalcite phase:cobalt spinel is less than 0.3:1.

17. A catalyst intermediate as claimed in claim 14, which has been dried at a temperature not exceeding 160° C.

18. A catalyst consisting of a catalyst intermediate as claimed in claim 14, which has been reduced in a hydrogen-containing gas to convert at least a part of said cobalt compound to metallic cobalt.

* * * * *